United States Patent
Xie et al.

(10) Patent No.: US 7,496,263 B2
(45) Date of Patent: Feb. 24, 2009

(54) THERMOSETTING OPTICAL WAVEGUIDE COATING

(75) Inventors: Ming Xie, Greer, SC (US); Kenneth L. Strickland, Simpsonville, SC (US)

(73) Assignee: Fujifilm Manfacturing U.S.A. Inc., Greenwood, SC (US)

( * ) Notice: Subject to any disclaimer, the term of this patent is extended or adjusted under 35 U.S.C. 154(b) by 0 days.

(21) Appl. No.: 11/759,462

(22) Filed: Jun. 7, 2007

(65) Prior Publication Data

US 2008/0304799 A1    Dec. 11, 2008

(51) Int. Cl.
*G02B 6/10* (2006.01)

(52) U.S. Cl. .................... 385/129; 385/131; 65/432; 65/450; 427/163.2

(58) Field of Classification Search ......... 385/129–132; 65/430, 432, 447, 450; 427/162, 163.2; 264/1.24
See application file for complete search history.

(56) References Cited

U.S. PATENT DOCUMENTS

| | | | |
|---|---|---|---|
| 3,253,500 A | 5/1966 | Hicks, Jr. |
| 3,874,783 A | 4/1975 | Cole |
| 4,116,739 A | 9/1978 | Glenn |
| 4,344,668 A | 8/1982 | Gunther et al. |
| 4,418,986 A | 12/1983 | Yata et al. |
| 4,469,402 A | 9/1984 | Yata et al. |
| 4,511,215 A | 4/1985 | Butler |
| 4,586,781 A | 5/1986 | Gunther et al. |
| 4,668,869 A | 5/1987 | Matosian et al. |
| 4,674,836 A | 6/1987 | Yata et al. |
| 4,743,090 A | 5/1988 | Reidinger |
| 5,066,947 A | 11/1991 | Du Castel |
| 5,274,406 A | 12/1993 | Tejima et al. |
| 5,381,502 A | 1/1995 | Veligdan |
| 5,422,691 A | 6/1995 | Ninomiya et al. |
| 5,455,882 A | 10/1995 | Veligdan |
| 5,481,385 A | 1/1996 | Zimmerman et al. |
| 5,521,725 A | 5/1996 | Beeson et al. |
| 5,625,736 A | 4/1997 | Veligdan |
| 5,642,194 A | 6/1997 | Erskine |
| 5,642,449 A | 6/1997 | Phillips |
| 5,668,907 A | 9/1997 | Veligdan |
| 5,684,905 A | 11/1997 | Sugawara et al. |
| 5,716,118 A | 2/1998 | Sato et al. |

(Continued)

FOREIGN PATENT DOCUMENTS

GB    2058385    4/1981

(Continued)

OTHER PUBLICATIONS

Veligdan, "Unique Interactive Projection Display Screen," 7 pages (Sep. 1997).

(Continued)

*Primary Examiner*—Sung H Pak
*Assistant Examiner*—Daniel Petkovsek
(74) *Attorney, Agent, or Firm*—Thompson Hine LLP (57) ABSTRACT

A method for making a panel comprising the steps of providing a plurality of waveguides including an optical core layer having a first and a second surface coated with a cladding material that forms a cladding layer, positioning a thermosetting adhesive between the plurality of waveguides, wherein the thermosetting adhesive includes a thermosetting resin, and curing the thermosetting adhesive.

28 Claims, 7 Drawing Sheets

U.S. PATENT DOCUMENTS

| | | | |
|---|---|---|---|
| 5,719,981 A | 2/1998 | Katoh et al. | |
| 5,764,845 A | 6/1998 | Nagatani et al. | |
| 5,828,427 A | 10/1998 | Faris | |
| 5,841,496 A | 11/1998 | Itoh et al. | |
| 5,914,760 A | 6/1999 | Daiku | |
| 5,940,565 A | 8/1999 | Sugawara | |
| 5,949,933 A | 9/1999 | Steiner et al. | |
| 6,002,826 A | 12/1999 | Veligdan | |
| 6,012,816 A | 1/2000 | Beiser | |
| 6,031,954 A | 2/2000 | Higuchi | |
| 6,091,879 A | 7/2000 | Chan et al. | |
| 6,215,920 B1 | 4/2001 | Whitehead et al. | |
| 6,285,426 B1 | 9/2001 | Akins et al. | |
| 6,301,417 B1 | 10/2001 | Biscardi et al. | |
| 6,335,149 B1 | 1/2002 | Xu et al. | |
| 6,487,350 B1 | 11/2002 | Veligdan et al. | |
| 6,512,874 B2 | 1/2003 | Xu et al. | |
| 6,519,400 B2 | 2/2003 | Biscardi et al. | |
| 6,535,674 B2 | 3/2003 | Veligdan | |
| 6,571,044 B2 | 5/2003 | Veligdan | |
| 6,657,723 B2 | 12/2003 | Cohen et al. | |
| 6,727,313 B2 | 4/2004 | Zhou et al. | |
| 6,728,456 B1 | 4/2004 | Aylward et al. | |
| 6,741,779 B2 | 5/2004 | Veligdan | |
| 6,757,469 B2 | 6/2004 | Bauer et al. | |
| 6,771,867 B2 * | 8/2004 | Ishihara | 385/129 |
| 6,825,983 B2 | 11/2004 | Bourdelais et al. | |
| 6,832,037 B2 | 12/2004 | Aylward et al. | |
| 6,847,772 B2 | 1/2005 | Inoue et al. | |
| 6,856,753 B2 | 2/2005 | Biscardi et al. | |
| 6,895,151 B2 | 5/2005 | Biscardi et al. | |
| 6,895,158 B2 | 5/2005 | Aylward et al. | |
| 6,906,761 B2 | 6/2005 | Nakano | |
| 6,917,749 B2 | 7/2005 | Gao et al. | |
| 6,931,167 B2 * | 8/2005 | Ohtsu et al. | 385/14 |
| 6,934,080 B2 | 8/2005 | Saccomanno et al. | |
| 6,948,820 B2 | 9/2005 | Veligdan et al. | |
| 6,999,665 B2 | 2/2006 | Veligdan | |
| 7,046,439 B2 | 5/2006 | Kaminsky et al. | |
| 7,072,563 B2 | 7/2006 | Shelnut et al. | |
| 7,072,565 B2 | 7/2006 | Shelnut et al. | |
| 7,116,873 B2 | 10/2006 | Veligdan | |
| 7,187,831 B2 | 3/2007 | DeSanto et al. | |
| 2004/0028369 A1 * | 2/2004 | Aylward et al. | 385/145 |

FOREIGN PATENT DOCUMENTS

| | | |
|---|---|---|
| WO | 00/04406 | 1/2000 |
| WO | 01/13050 | 3/2000 |
| WO | 2004/034099 | 4/2004 |

OTHER PUBLICATIONS

Beiser, et al., "Ten Inch Planar Optic Display," Proceedings of the International Society for Optical Engineering (SPIE), vol. 2734, 9 pages (Apr. 1996).

Yoder, "The State-of-the-Art in Projection Display: An Introduction of the Digital Light Processing DLP," Texas Instruments Web Site, 7 pages (Mar. 1997).

DeSanto, et al., "Polyplanar Optical Display Electronics," Proceedings of the International Society (SPIE), vol. 3057, 12 pages (Apr. 1997).

* cited by examiner

THERMOSETTING OPTICAL WAVEGUIDE COATING

BACKGROUND

The present application relates generally to a thermosetting adhesive used in adhering or bonding optical waveguides to form panels.

Optical waveguides have been used to develop panels that may be useful as optical display screens. The panel may be used for rear projection displays, such as those taught in U.S. Pat. Nos. 6,457,834 and 6,999,665, which are incorporated by reference herein. The panel may be used for front projection displays, such as those taught in U.S. Pat. Nos. 6,535,674, 6,741,779, and 7,116,873, which are incorporated by reference herein. Waveguides include a transmissive core bound by cladding where the index of refraction of the cladding is less than the index of refraction for the core. Typically, waveguides may be in the form of flat ribbons stacked vertically and extending continuously in the horizontal direction along the entire panel width.

Typical waveguides and the panels made from waveguides tend to degrade when exposed to extreme environmental conditions (e.g., rain, sun, extreme temperatures, pressures, and humidity or extreme changes in temperature, pressure, and humidity). Extreme environmental conditions may be experienced by panels used in airplanes (commercial or military), automobiles, or other outdoor or extreme environmental applications (i.e. movie theater screens, ATM machines screens, or televisions mounted outside). The cladding and the adhesive(s) used in typical waveguides are the likely cause of the degradation. Therefore, there is a need for an improved waveguide or optical structure incorporating a stronger adhesive so the waveguides or panel can withstand extreme environmental conditions.

SUMMARY

In one embodiment, disclosed is a method for making a panel comprising the steps of providing a plurality of waveguides including an optical core layer having a first and a second surface coated with a cladding material that forms a cladding layer, positioning a thermosetting adhesive between the plurality of waveguides, wherein the thermosetting adhesive includes a thermosetting resin, and curing the thermosetting adhesive.

In another embodiment, disclosed is a method for making a panel comprising the steps of providing a core layer having a first and a second surface, coating the first and the second surfaces of the core layer with a cladding material to form a cladding layer, positioning a thermosetting adhesive between a plurality of cladding coated core layers, wherein the thermosetting adhesive includes a thermosetting resin, and curing the thermosetting adhesive.

In another embodiment, the disclosed panel comprises a plurality of stacked waveguides, a thermosetting adhesive layer positioned between each of the stacked waveguides to adhere the stacked waveguides upon curing, the thermosetting adhesive including a thermosetting resin, and wherein the thermosetting adhesive layer is cured. The waveguides include including a core having a first and a second surface, a first cladding layer applied to the first surface of the core layer, and a second cladding layer applied to the second surface of the core layer.

Other embodiments of the disclosed optical waveguides and associated methods will become apparent from the following description, the accompanying drawings and the appended claims.

DETAILED DESCRIPTION

It is to be understood that the figures and descriptions of the present invention may have been simplified to illustrate elements that are relevant for a clear understanding of the present invention, while eliminating, for purposes of clarity, other elements found in a typical projection system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

As used herein the term "waveguide" means a device for guiding the flow of electromagnetic waves along a desired path. Waveguides include a core material bounded by a cladding wherein the index of refraction of the cladding is less than the index of refraction of the core. The waveguide may further include a light absorbing layer and/or an adhesive to adhere a plurality of waveguides together. Within a waveguide the core material has a refractive index that is higher than the refractive index of the cladding.

As used herein the term "panel" means a plurality of waveguides stacked and adhered to one another. The panel may be used for viewing images. The panel may be part of a screen used in visual projection applications. The panel may be useful in rear projection displays, such as those taught in U.S. Pat. Nos 6,457,834 and 6,999,665. The panel may be useful in front projection displays, such as those taught in U.S. Pat. Nos. 6,535,674, 6,741,779, and 7,116,873.

Figure 1:
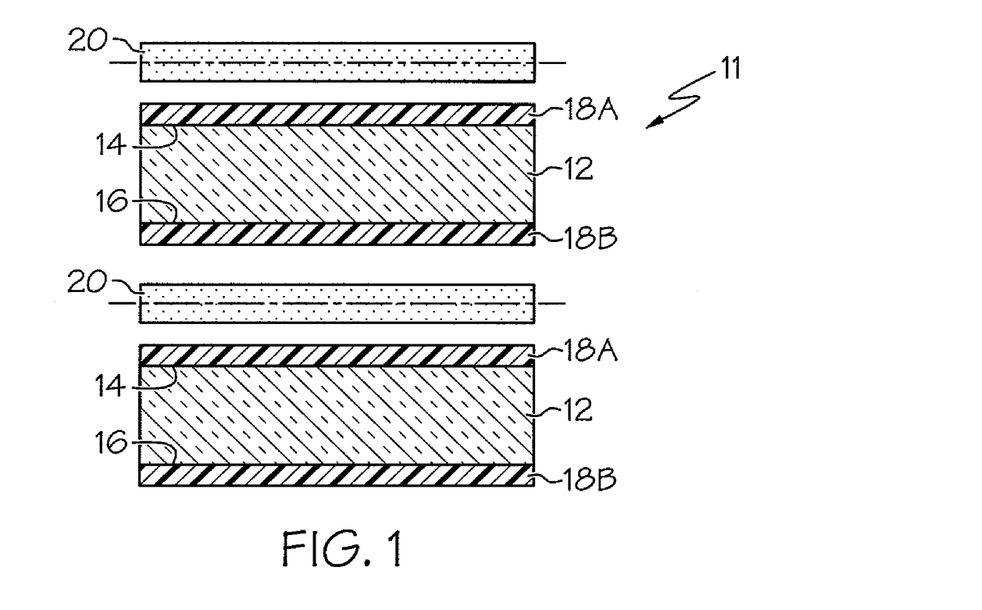
FIGS. 1-3 are side elevational views, in section, of various embodiments of wave guides.

The various compositions or materials within each of the layers of the various waveguides in the Figures described below will be described in further detail under the headings: The Core, The Cladding, and The Adhesive Layer. FIG. 1 shows an embodiment of waveguides, generally designated 11. Waveguides 11 include an optical core 12 having a first surface 14 and a second surface 16, a first cladding layer 18A applied to the first surface 14, and a second cladding layer 18B applied to the second surface 16 of core 12. The core may be provided or prepared and may be a sheet of material with a selected refractive index for the chosen panel parameters. One important parameter is the acceptance angle desired for light entering the panel. The core may have a thickness of 10 mil, 20 mil, or any other thickness that will work in the manufacturing process and result in a panel with the desired acceptance angle and other screen characteristics. In the embodiment shown in FIG. 1 an adhesive layer 20 is separate from waveguides 11 and may be inserted between the waveguides 11 to bond the waveguides 11 together to form a plurality of stacked waveguides.

Figure 2:
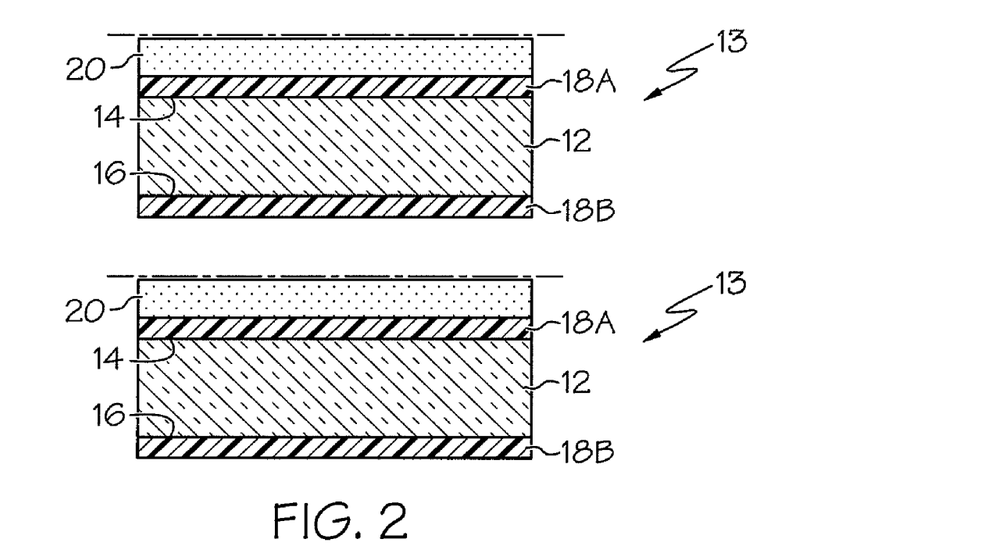

In another embodiment, as shown in FIG. 2, waveguides 13 may have adhesive layer 20 applied to the first cladding layer 18A. In another embodiment, adhesive 20 may be applied to the second cladding layer 18B.

Figure 3:
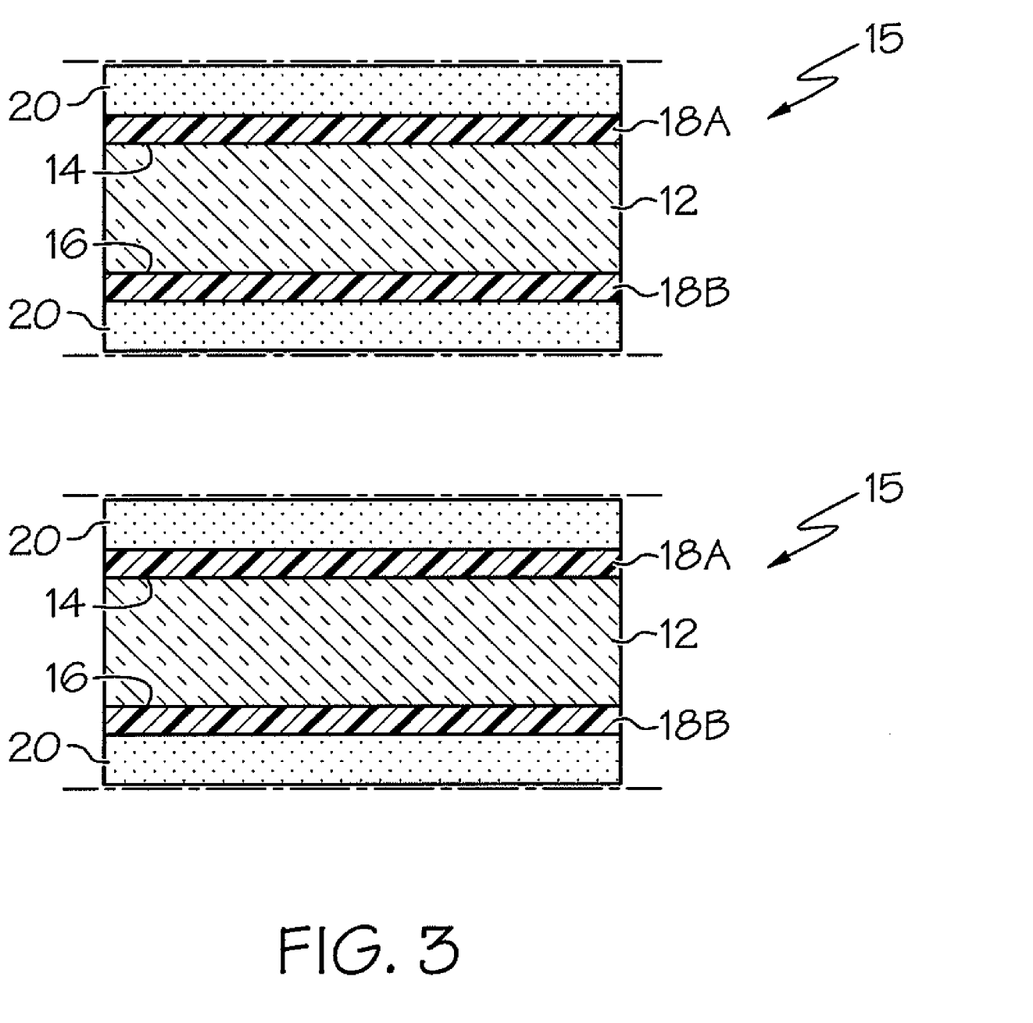

FIG. 3 shows another embodiment of waveguides, generally designated 15. Waveguides 15 include a core 12 bound by cladding layers 18A and 18B, which each have a layer of thermosetting adhesive 20 applied thereto. Adhesive layer 20 is shown of equal thickness on each cladding layer of both waveguides. In another embodiment, adhesive layer 20 may be of different thicknesses.

Figure 4:
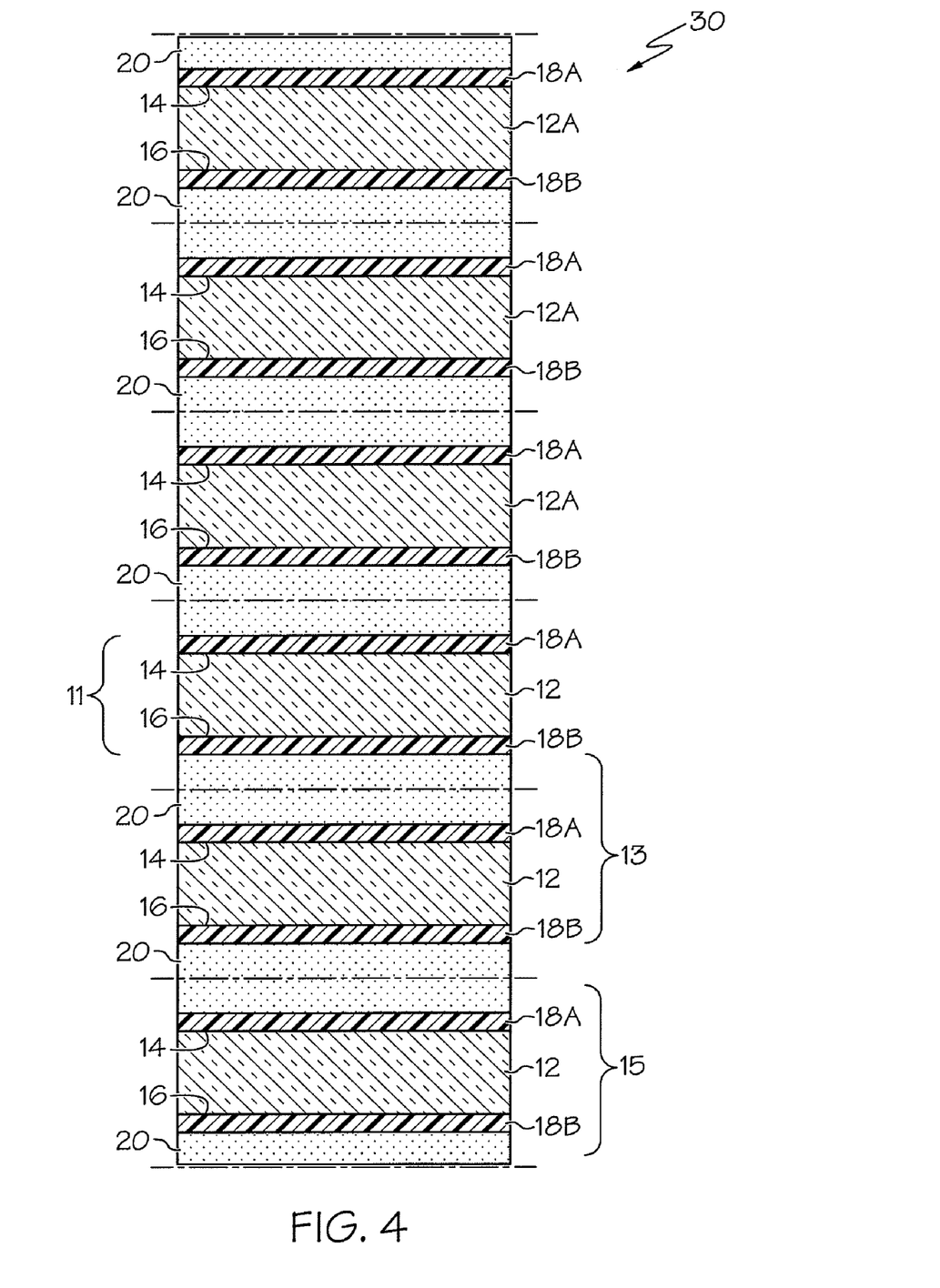
FIG. 4 is a side elevational view of a panel formed from stacked waveguides like those waveguides shown in FIGS. 1-3.

A plurality of the waveguides 11, 13, and/or 15 from any of the embodiments in FIGS. 1-3 may be stacked together and adhered by the thermosetting adhesive layer(s) 20 to form a panel 30, as shown in FIG. 4. Panel 30 may be of any size and any number of waveguides. The thermosetting adhesive layer(s) 20 bond adjacent waveguides together in forming the panel. Panel 30 includes a plurality of the following layers: an adhesive layer 20, a first cladding layer 18A, a core 12, and a second cladding layer 18B. Those skilled in the art will appreciate that a typical panel is not limited to the portion shown in FIG. 4, but may include many more layers stacked and adhered together.

Figure 5:
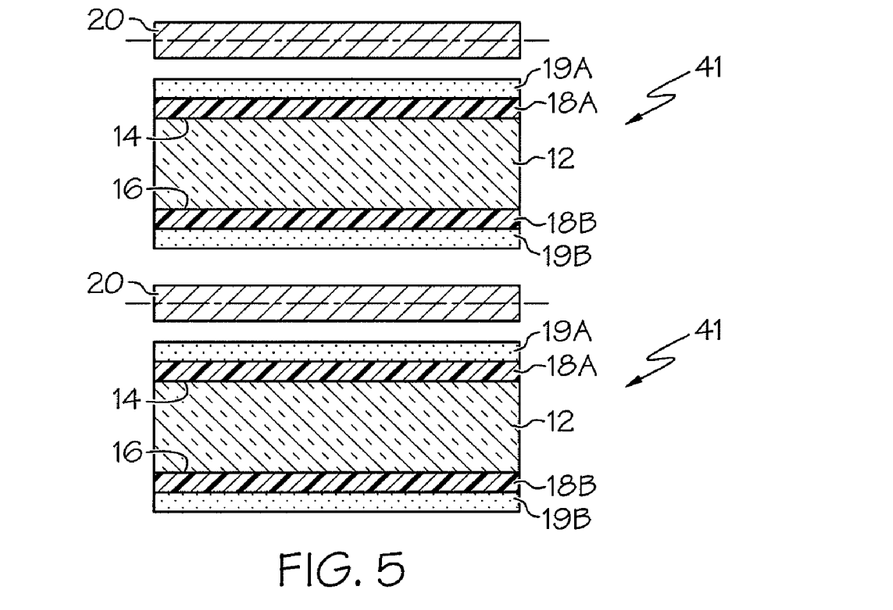
FIGS. 5-7 are side elevational views, in section, of various waveguides including a light absorbing layer.

FIG. 5 shows another embodiment of waveguides, generally designated 41. Waveguides 41 include an optical core 12 having a first surface 14 and a second surface 16, a first cladding layer 18A applied to the first surface 14, a second cladding layer 18B applied to the second surface 16, a first light absorbing composition 19A applied to the first cladding layer 18A, and a second light absorbing layer 19B applied to the second cladding layer 18B. An adhesive layer 20 is separate from waveguides 41 and may be inserted between the waveguides 41 to bond the waveguides 41 together to form a portion of panel 50, as shown in FIG. 8.

Figure 6:
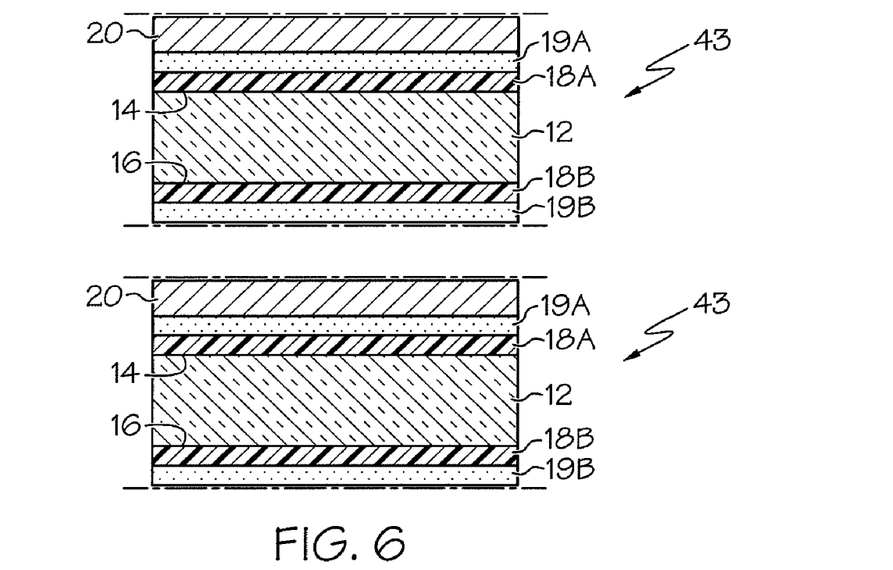
Figure 7:
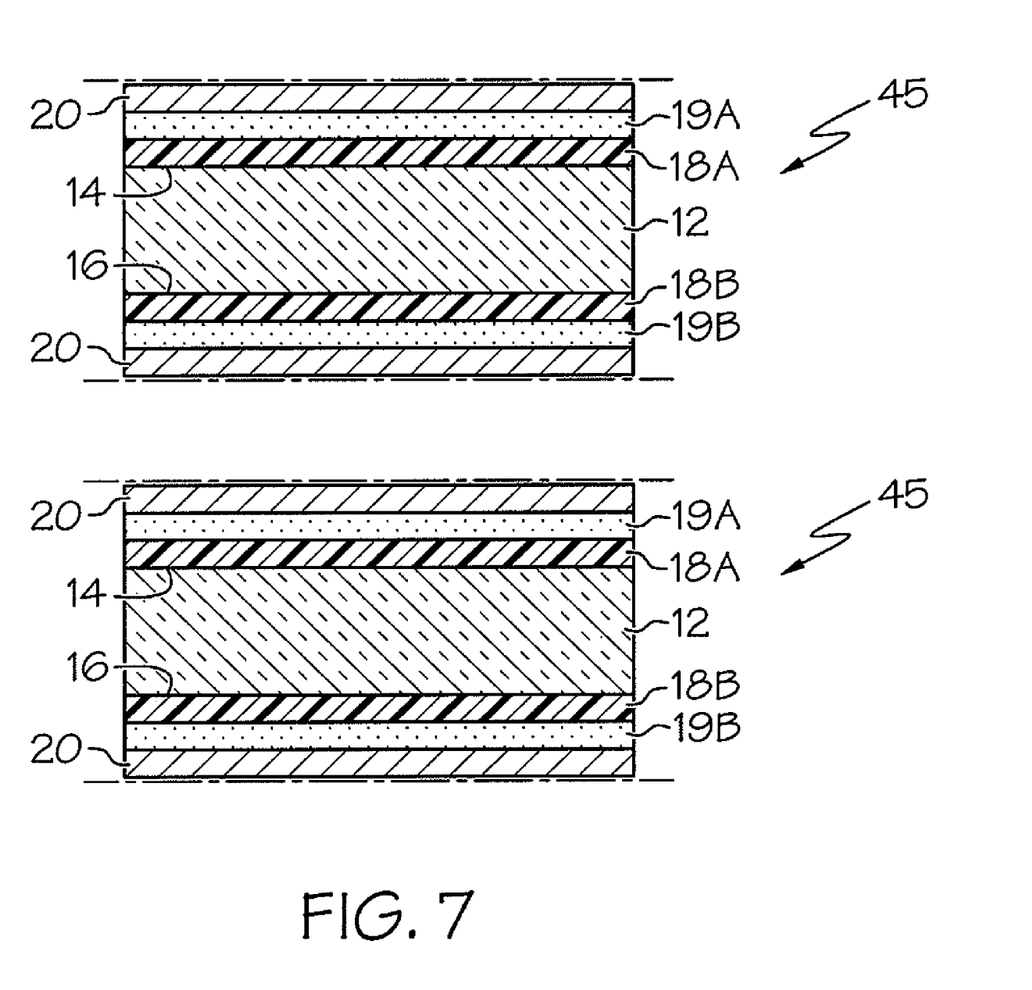

As shown in FIG. 6, waveguides 43 include a core 12 having a first surface 14 and a second surface 16, a first cladding layer 18A applied to the first surface 14, a second cladding layer 18B applied to the second surface 16, a first light absorbing composition 19A applied to the first cladding layer 18A, a second light absorbing layer 19B applied to the second cladding layer 18B, and a first adhesive layer 20 applied to the first light absorbing layer 19A. Adhesive layer 20 may be of a selected thickness to bond the waveguides 43 together to form panel 50. In another embodiment, adhesive layer 20 may instead be applied to a second light absorbing layer 19B. FIG. 7 shows another embodiment of waveguides, generally designated 45. Waveguides 45 includes a first adhesive layer 20 applied to the first light absorbing layer 19A and a second adhesive layer 20 applied to the second light absorbing layer 19B. Adhesive layer 20 is shown of equal thickness on each cladding layer of both waveguides. In another embodiment, adhesive layer 20 may be of varying thickness, so long as the thickness of the adhesive once the waveguides 45 are bonded together result in the selected thickness.

Figure 8:
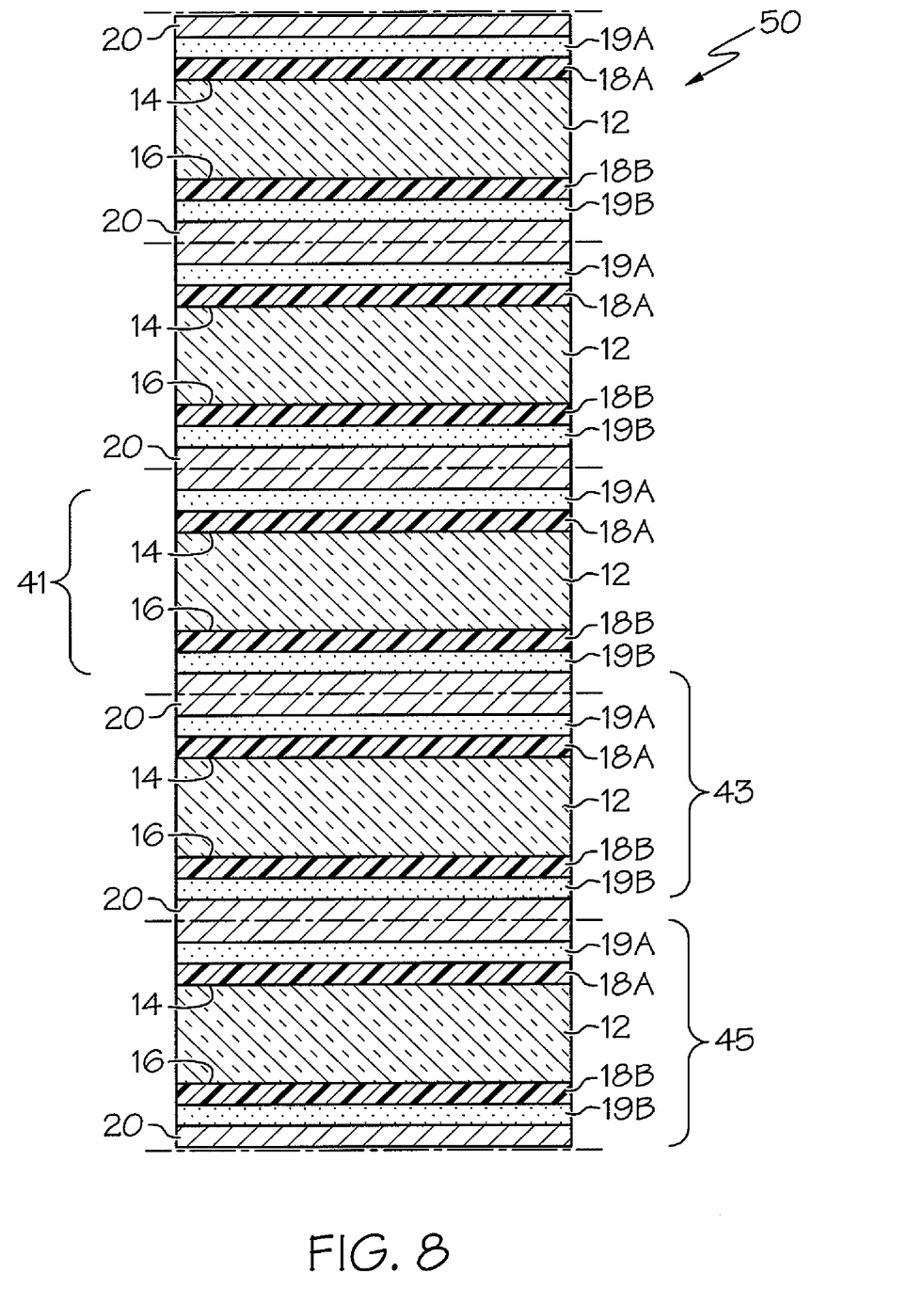
FIG. 8 is a side elevational view of a panel formed from stacked waveguides like those waveguides shown in FIGS. 5-7.

A plurality of the waveguides 41, 43, and/or 45 from any of the embodiments in FIGS. 5-7 may be stacked together and adhered by the thermosetting adhesive layer(s) 20 to form a panel 50, as shown in FIG. 8. Panel 50 may be of any size and any number of waveguides. The thermosetting adhesive layer(s) 20 bond adjacent waveguides together in forming the panel. Panel 30 includes a plurality of the following layers: an adhesive layer 20, a first light absorbing layer 19A, a first cladding layer 18A, a core 12, and a second cladding layer 18B, and a second light absorbing layer 19B. Those skilled in the art will appreciate that a typical panel is not limited to the portion shown in FIG. 8, but may include many more layers stacked and adhered together.

In another embodiment, panels made of stacked waveguides, like panels 30 and 50, may include a light directing film that is used to turn light rays arriving in a shallow entrance angle into core 12. In another embodiment, the panel may include a light shaping film on the viewing side of the panel, separately or in combination with the light directing film, to spread light in a horizontal and vertical viewing direction as the light exits the panel. The panel may include any other features to improve the transmission of light rays along the length of the waveguides.

Figure 9:
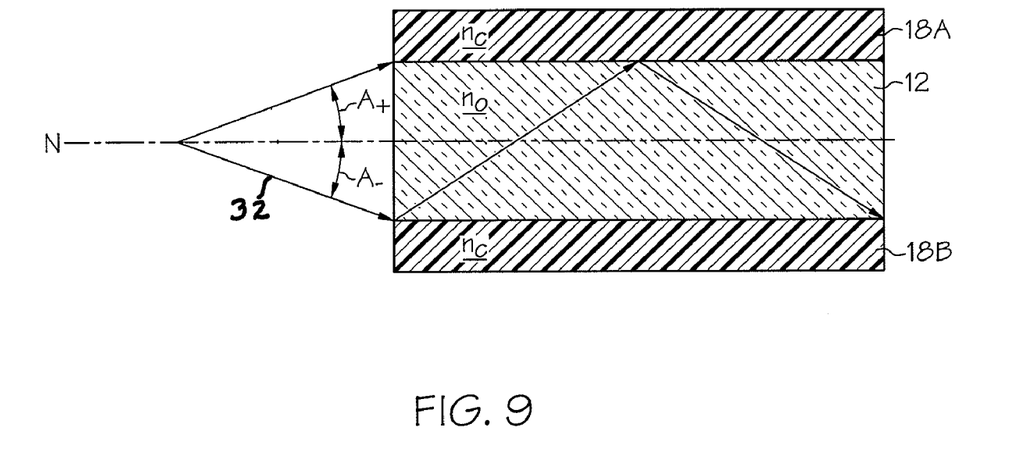
FIG. 9 is a side elevational view, in section, of a waveguide showing the angle of acceptance.

In simple terms, the behavior of light entering the core material in a waveguide is fundamentally controlled by the property of the core, cladding, and medium surrounding the waveguide. Referring to FIG. 9, the core has a refractive index $n_o$ and the cladding has a refractive index $n_c$. A light ray entering core 12 is either refracted into the cladding 18A, 18B and attenuated (absorbed), or it is totally internally reflected at the core/cladding boundary. Total internal reflection is the reflection of the total amount of incident light at the boundary between the core and cladding. In this manner light travels within core 12 along the length of the waveguide. The maximum angle at which the light ray may enter core 12 and travel by total internal reflection within the core is termed the acceptance angle A. The value of the acceptance angle depends mainly on the properties of the selected core and cladding. The acceptance angle A, half the angle of the light acceptance cone 32, is measured between the incident ray and the normal line N to the interface of core 12, as shown in FIG. 9. The acceptance angle is often labeled theta θ. The angle range for the acceptance angle is understood by the relationship $\sin\theta \leq (n_o^2 - n_c^2)^{1/2}$ (assuming incoming ray is traveling through air with a refractive index of 1). When the acceptance angle is above the normal line N it is considered to be a positive acceptance angle $A_+$ and when the acceptance angle is below the normal line N it is considered to be a negative acceptance angle $A_-$. The larger the difference in refractive index between core 12 and the cladding 18A, 18B, the larger the acceptance angle may be for light rays entering core 12 to be totally internally reflected.

The first and second cladding layers 18A, 18B may have the same refractive index. The refractive index of cladding layers 18A, 18B is less than the refractive index of core 12A. The refractive index of a material is the ratio of the velocity of propagation of an electromagnetic wave in vacuum to its velocity in the material. The refractive index (n) of a material is defined as follows:

$$n = V_v/V$$

wherein $V_v$ is the velocity of light in a vacuum and V is the velocity of light in the material. In general light slows down when it enters a material. Therefore, the refractive index of a material will always be greater than 1. Most materials have refractive indices between 1.32 and 2.40.

Some typical refractive indexes (RI) of various materials are about:

TABLE 1

| MATERIAL | RI |
| --- | --- |
| Chlorotrifluoro-Ethylene (CTFE) | 1.42 |
| Cellulose Propionate | 1.46 |
| Cellulose Acetate Butyrate | 1.46-1.49 |
| Cellulose Acetate | 1.46-1.50 |
| Methylpentene Polymer | 1.485 |
| Ethyl Cellulose | 1.47 |
| Acetal Homopolymer | 1.48 |
| Acrylics | 1.49 |
| Cellulose Nitrate | 1.49-1.51 |
| Polypropylene (Unmodified) | 1.49 |
| Polyallomer | 1.492 |
| Polybutylene | 1.50 |
| Ionomers | 1.51 |
| Polyethylene (Low Density) | 1.51 |
| Nylons (PA) Type II | 1.52 |
| Acrylics Multipolymer | 1.52 |
| Polyethylene (Medium Density) | 1.52 |
| Styrene Butadiene Thermoplastic | 1.52-1.55 |
| PVC (Rigid) | 1.52-1.55 |
| Nylons (Polyamide) Type 6/6 | 1.53 |
| Urea Formaldehyde | 1.54-1.58 |
| Polyethylene (High Density) | 1.54 |
| Styrene Acrylonitrile Copolymer | 1.56-1.57 |
| Polystyrene | 1.57-1.60 |
| Polycarbornate (Unfilled) | 1.586 |
| Polystyrene | 1.59 |

As can be noted from this information many polymers that might be used in waveguides have refractive indexes that are fairly close together.

As the difference in refractive index between core 12 and the first and second cladding layers 18A, 18B becomes larger, the greater the acceptance angle of light entering the optical structure, waveguide, or panel. That is, light entering at angles within the range of the acceptance angle can be totally internally reflected without being absorbed. When the refractive index difference between core 12 and the first and second cladding layers 18A, 18B becomes smaller, some of the light may be transmitted into the cladding layers instead of traveling through the core. This becomes important in the selection of compatible materials. In order to make an optical structure, waveguide, or panel useful for projection or other applications, the core 12 and cladding material 18A, 18B must adhere to each other, have an optimal difference in refractive index, and create the selected range of acceptance angle. Such selection is difficult.

The Core

The optical core may be any optical grade material deemed suitable for waveguides. For example, the optical core may include one or more of the following: polycarbonates, polymethylmethacrylates (PMMA), glass, polyesters, cellulose, cyclic olefins and/or copolymers thereof, or other suitable optical grade materials. The optical core may be one of the materials listed in Table 1 above or combinations thereof. Examples of the polyester cores include polyethylene terephthalate, polyethylene naphthalate or a combination thereof. Cores are selected that have excellent optical properties and will transmit light with minimal distortion or absorption of light. To provide good viewing characteristics, the optical core may have a percent transmission of between about 80 to about 100%. Transmissions less than 80% may absorb or scatter more light, thereby reducing the overall brightness of the resulting waveguide.

In one embodiment the selected optical core may have a refractive index between about 1.4 to about 1.6. A polycarbonate core may have a refractive index of about 1.58. A PMMA core may have a refractive index of about 1.48. A cellulose core may have a refractive index of about 1.54. A polyethylene terephthalate core may have a refractive index of about 1.57.

At this point, those skilled in the art will appreciate that any known or available optical material or combinations of optical materials may be used to form the core without departing from the scope of the present disclosure.

The Cladding

The cladding material may be any polymer, polymer mixture, organic material, inorganic material, or mixtures or combinations thereof that has an index of refraction that is lower than the index of refraction of the optical core and will result in a waveguide with the desired acceptance angle range. In one embodiment, the cladding may include any other ingredient or chemical substance that will make the cladding have the necessary properties for use in a waveguide or panel. In one embodiment, the cladding may be selected from the group consisting of a polyurethane, epoxy, carboxylated acrylic, acrylic styrene polymer, n-butylacrylate/MMA, and polyethylene glycol diacrylate, or combinations thereof. In selecting the cladding material, the refractive index of the cladding may be formulated based on the acceptance angle A or acceptance angle range selected for the waveguide. The acceptance angles may be about ±5° to about ±40°. In another embodiment, the waveguides may be designed to have an acceptance angle range of ±5° to about ±30°. The cladding may be selected based on whether it will optimize the mechanical strength of the waveguide and/or panel.

In one embodiment, the cladding may be a carbonated polyurethane or polycarbonated polyurethane. Polycarbonated polyurethane is available from C. L. Hauthaway & Sons Corporation as Hauthane HD-2501, HD-2503, 2504, HD-2001, HD-2101, or HD-2255 which are soft, aliphatic, polycarbonate-based, polyurethane dispersions. In another embodiment, the cladding may be mixtures of carbonated or polycarbonated polyurethane and carboxylated styrene butadiene latex. A carboxylated styrene butadiene latex is available from Mallard Creek Polymers, Inc. as Rovene® 4457, 4041, or 4487 carboxylated styrene butadiene latex or from Dow Reichhold Specialty Latex LLC as DL 216. In another embodiment, the cladding may be mixtures of polycarbonated polyurethane and anionic liquid polyester. Any of these cladding materials may work well with a polycarbonate core.

In one embodiment the carbonated or polycarbonated polyurethane and carboxylated styrene butadiene latex may be mixed in varying ratios. The mixing ratio may be dependent upon the acceptance angle selected and optimizing mechanical strength of the waveguide and/or panel. The resulting dry refractive index (RI) of the mixture varies slightly depending upon which carbonated or polycarbonate polyurethane and carboxylated styrene butadiene latex were in the mixture, and on the mixture ratio, as shown in Table 1.

TABLE 1

| Polycarbonate Polyurethane | Carboxylated Styrene Butadiene | Mixture Ratio Respectively | Dry RI | Mixture Ratio Respectively | Dry RI | Mixture Ratio Respectively | Dry RI |
|---|---|---|---|---|---|---|---|
| Hauthane HD-2501 | Mallard Creek Polymer Roven 4457 | 50 g:50 g | 1.535 | 40 g:60 g | 1.5422 | 60 g:40 g | 1.5292 |
| Hauthane HD-2501 | Mallard Creek Polymer Roven 4041 | 50 g:50 g | 1.5335 | 40 g:60 g | 1.5409 | 60 g:40 g | 1.5262 |
| Hauthane HD-2501 | Mallard Creek Polymer Roven 4487 | 50 g:50 g | 1.5384 | 40 g:60 g | 1.5453 | 60 g:40 g | 1.5291 |
| Hauthane HD-2501 | Dow Reichhold DL 216 | 50 g:50 g | 1.5305 | 40 g:60 g | 1.5468 | 60 g:40 g | 1.5305 |
| Hauthane HD-2255 | Mallard Creek Polymer Roven 4487 | 50 g:50 g | 1.5287 | 40 g:60 g | 1.531 | | |
| Hauthane HD-2255 | Mallard Creek Polymer Roven 4041 | 50 g:50 g | 1.5282 | 40 g:60 g | 1.5357 | | |
| Hauthane HD-2001 | Mallard Creek Polymer Roven 4041 | 50 g:50 g | 1.5382 | 40 g:60 g | 1.5435 | | |
| Hauthane HD-2101 | Mallard Creek Polymer Roven 4041 | 50 g:50 g | 1.5406 | 40 g:60 g | 1.546 | | |
| Hauthane HD-2101 | Mallard Creek Polymer Roven 4457 | 50 g:50 g | 1.5422 | 40 g:60 g | 1.5476 | | |
| Hauthane HD-2101 | Mallard Creek Polymer Roven 4487 | 50 g:50 g | 1.5398 | 40 g:60 g | 1.5453 | | |

| Polycarbonate Polyurethane | Anionic Liquid Polyester | Mixture Ratio Respectively | Dry RI | Mixture Ratio Respectively | Dry RI | Mixture Ratio Respectively | Dry RI |
|---|---|---|---|---|---|---|---|
| Hauthane HD-2501 | EvCote PGLR-25 | 50 g:50 g | 1.5126 | 30 g:70 g | 1.526 | 40 g:60 g | 1.5187 |

In another embodiment, the cladding may be an anionic liquid polyester such as EvCote PGLR-25 with a dry RI of about 1.53 (made by EvCo Research LLC), a styrene acrylic copolymer such as Glascol C44 with a dry RI of about 1.53 (made by Ciba Specialty Chemicals), a carboxylic acid functionality such as Glascol RP3 with a dry RI of about 1.483 (made by Ciba Specialty Chemicals), a n-butylacrylate/MMA such as Rohatol DV 544 with a RI of about 1.534, a polyethylene oxide in water such as poly-OX N10 14% with a dry RI of about 1.47, or a polyvinyl alcohol in water such as Elvanol 5105 18% with a dry RI of about 1.49.

In another embodiment, an acrylate based cladding may be selected for use with a core of polymethylmethacrylate or copolymers thereof. In some embodiments, the core and cladding material include at least one polymer of similar functionality group, e.g. an acrylate, a carbonate or polycarbonate, a polyester, etc. to increase the adhesion between the layers.

In one embodiment, the cladding may include a light absorbing material. The light absorbing material may be any suitable light absorbing material, such as carbon black, a dark material, a dark pigment, or a dark-colored dye. Dark includes black, grey, or any other color that is capable of absorbing ambient or other light entering the waveguide at greater than the acceptance angle. Light entering the waveguide or panel at greater than the acceptance angle needs to be absorbed so it does not travel through the waveguide it entered in to an adjacent waveguide, otherwise the image for the viewer may be fuzzy. The light absorbing material may be a powder or a liquid dispersion wherein particles to be dispersed are about 0.05 µm to about 20 µm. In one embodiment the particles are about 0.05 µm to about 7 µm. In another embodiment the particles are about 0.05 µm to about 1 µm. Carbon black may be obtained from Cabot Corporation, Dick Blick Art Materials, Penn Color, Inc., Solution Dispersions, Inc., Wolstenholme International Ltd., or Color Mate, Inc. In one embodiment, the light absorbing composition may include carbon black and a binder, like an acrylic polymer, to disperse the carbon particles.

The cladding may include a surfactant. The surfactant is usually added to the composition to aid in the application of the cladding composition onto the core. The surfactant helps the cladding composition flow smoothly during manufacturing. The cladding composition may also include water. The resulting cladding composition may be a mixture of liquids to form a solution that may be mixed and used in the manufacturing process.

Examples of surfactants include anionic surfactants, amphoteric surfactants, cationic surfactants, and non-ionic surfactants. Examples of anionic surfactants include alkylsulfocarboxylates, alpha olefin sulfonates, polyoxyethylene alkyl ether acetates, N-acylaminoacids and salts thereof, N-acylmethyltaurine salts, alkylsulphates, polyoxyalkylether sulphates, polyoxyalkylether phosphates, rosin soap, castor oil sulphate, lauryl alcohol sulphate, alkyl phenol phosphates, alkyl phosphates, alkyl allyl sulfonates, diethylsulfosuccinates, diethylhexylsulfosuccinates, dioctylsulfosuccinates and the like. Examples of the cationic surfactants include 2-vinylpyridine derivatives and poly-4-vinylpyridine derivatives. Examples of the amphoteric surfactants include lauryl dimethyl aminoacetic acid betaine, 2-alkyl-N-carboxymethyl-N-hydroxyethyl imidazolinium betaine, propyldimethylaminoacetic acid betaine, polyoctyl polyaminoethyl glycine, and imidazoline derivatives.

Examples of non-ionic surfactants include non-ionic fluorinated surfactants and non-ionic hydrocarbon surfactants. Examples of non-ionic hydrocarbon surfactants include ethers, such as polyoxyethylene nonyl phenyl ether, polyoxyethylene octyl phenyl ether, polyoxyethylene dodecyl phenyl ether, polyoxyethylene alkyl allyl ethers, polyoxyethylene oleyl ethers, polyoxyethylene lauryl ethers, polyoxyethylene alkyl ethers, polyoxyalkylene alkyl ethers; esters, such as polyoxyethylene oleate, polyoxyethylene distearate, sorbitan laurate, sorbitan monostearate, sorbitan monooleate, sorbitan sesquioleate, polyoxyethylene monooleate, polyoxyethylene stearate; glycol surfactants and the like. The above-mentioned surfactants are typically added to the coating in an amount ranging from about 0.1 to 1000 mg/m$^2$, preferably from about 0.5 to 100 mg/m$^2$.

The cladding may optionally further comprise one or more conventional additives, such as biocides; pH controllers, matting agents, preservatives; defoamers; viscosity modifiers; dispersing agents; UV absorbing agents; anti-oxidants; and/or antistatic agents. These additives may be selected from known compounds and materials in accordance with the objects to be achieved. In one embodiment, the above-mentioned additives may be added in a range of 0 to 10% by weight, based on the solid content of the layer.

The cladding compositions may be coated onto a substrate by any method known in the art. The substrate may be the core, other cladding, or any other material that will make a suitable substrate for use in the manufacturing process. Examples of coating methods include curtain coating, extrusion coating, air-knife coating, slide coating, forward roll coating, reverse roll coating dip coating, and rod bar coating. In another embodiment, the cladding composition may be laminated onto the core, or applied to the core by film transfer.

In applying the cladding composition as a coating on the core the cladding may be applied to one side of the core and then dried. Once the cladding composition has dried into a cladding layer, the process may be repeated to apply the cladding composition to the other side of the core or to apply other layers on the now dried cladding layer. The second layer is then allowed to dry (in an oven, at climate controlled conditions, at room conditions or by any other method known in the art.) In another embodiment multiple layers may be applied to the core simultaneously and then dried, left to set, or cured by any method known in the art. In another embodiment, the cladding is coated onto both sides of the core simultaneously and then dried.

At this point, those skilled in the art will appreciate that any known or available cladding material or combinations of cladding materials may be used to form the cladding without departing from the scope of the present disclosure.

The Adhesive Layer

In one embodiment, an adhesive composition may be positioned between stacked waveguides to adhere or bond the plurality of waveguides into a panel. In another embodiment, the adhesive composition may be applied to at least one of the light absorbing layers. In one embodiment, the adhesive composition that forms the thermosetting adhesive layer includes a thermosetting resin. The thermosetting adhesive layer may further include a curing agent, an accelerator, or a promoter. A curing agent is a substances or mixtures of substances added to a polymer composition to promote or control the curing reaction. It should be understood that the thermosetting resin may be one particular resin or a combination of resins, and the curing agent may be one particular curing agent or a combination of curing agents. In one embodiment, the thermosetting adhesive layer may include two or more layers.

In one embodiment, the thermosetting resin and/or curing agent may be selected such that the resulting adhesive remains uncured at room temperatures, yet cures (i.e., sets) at a relatively low temperature (less than about 150° C.) to avoid damaging the other materials and layers with excessive heat. The selected curing temperature may be less than the melting point of the core layer. In another embodiment, the thermosetting resin and/or curing agent may be selected such that the resulting adhesive cures at a temperature of less than about 100° C. In another embodiment, the thermosetting resin and/or curing agent may be selected such that the resulting adhesive cures at about room temperature, or between about 70 to 90° C.

At this point, those skilled in the art will appreciate that the thermosetting resin should be selected to form an adhesive that adheres to the material or materials selected for the any of the cladding layers. "Thermosetting" as used herein means any material that cures through the addition of energy, such as from heat, a chemical reaction, or irradiation, to form a crosslinked material than cannot be melted and re-shaped after it is cured.

In one embodiment, the thermosetting adhesive may be a thermosetting resin. The thermosetting resin may be a urethane, polyurethane, polyester, polyimide, acrylic resin, epoxy resin, silicone, urea-formaldehyde resin, melamine-formaldehyde resin, phenolic resin, rubber, latex, or vinyl ester, or a combination thereof. The combination of one or more of the resins may require further chemical reaction to cure, crosslink, or vulcanize the resins. In one embodiment, the epoxy resin may be selected from the group consisting of a bisphenol epoxy, urethane modified epoxy, a rubber modified epoxy and mixtures thereof. In another embodiment, the thermosetting resin may be an aqueous dispersion. Examples of thermosetting epoxy resins useful in adhesive layer 20 are available from Resolution Performance Products, such as EPI-REZ™ resin 5520—a urethane-modified epoxy resin, EPI-REZ™ resin 3522—a solid Bisphenol A epoxy resin, EPI-REZ™ resin 3540—a solid Bisphenol A epoxy resin with an organic co-solvent, or EPI-REZ™ resin 3519—a butadiene-acrylonitrile modified epoxy.

Examples of suitable curing agents for curing the thermosetting resin of the adhesive layer 20 are listed in Table 2. Those skilled in the art will appreciate that the curing agents listed in Table 2 are only examples and Table 2 is not intended to be limiting or all inclusive.

TABLE 2

| Curing Agent | Curing Temperature Range, ° C. |
|---|---|
| Aliphatic Amines | |
| EPI-CURE ® curing agent 3223 (DETA) | 15-150 |
| EPI-CURE ® curing agent 3234 (TETA) | 15-150 |
| JEFFAMINE D-230 | 15-150 |
| JEFFAMINE D-400 | 25-150 |
| EPI-CURE ® curing agent 3300 (IPDA) | 25-150 |
| Bis (p-amino-cyclohexyl) Methane | 25-150 |
| EPI-CURE ® curing agent 3200 (AEP) | 25-150 |
| EPI-CURE ® curing agent 3282 | 15-150 |
| EPI-CURE ® curing agent 3290 (Propylene Oxide Amine) | 15-150 |

TABLE 2-continued

| Curing Agent | Curing Temperature Range, ° C. |
|---|---|
| Polyamids | |
| EPI-CURE ® curing agent 3115 | 15-150 |
| EPI-CURE ® curing agent 3125 | 15-150 |
| EPI-CURE ® curing agent 3140 | 15-150 |
| EPI-CURE ® curing agent 3175 | 15-150 |
| Aromatic Amines | |
| ANCAMINE Z | 60-200 |
| ANCAMINE Y | 60-200 |
| Metaphenylenediamine | 60-200 |
| Methylene Dianiline | 60-200 |
| Diaminodiphenyl Sulfone | 115-200 |
| Anhydrides | |
| Methyl Tetrahydrophthalic Anhydride | 94-150 |
| NADIC Methyl Anhydride | 80-260 |
| Dodecenylsuccinic Anhydride | 60-150 |
| Phthalic Anhydride | 94-150 |
| Hexahydrophthalic Anhydride | 94-200 |
| Chlorendic Anhydride | 94-200 |
| Tetrahydrophthalic Anhydride | 94-150 |
| Trimellitic Anhydride | 100-200 |
| 3,3',4,4'-Benxophenonetetracarboxylic Dianhydride | 170-220 |
| Miscellaneous | |
| 2-ethyl-4-methyl imidazole | 60-150 |
| $BF_3$-Monoethylamine | 115-200 |
| ANCAMINE K54 (a polyamine salt) | 65-150 |
| Diethylaminopropylamine | 25-150 |
| Trimercaptan | 4-60 |
| Trimer Acid | 125-165 |
| Dicyandiamide | 150-175 |

As used herein, DETA stands for diethylene triamine, TETA stands for triethylene tetramine, IPDA stands for isophorone diamine and AEP stands for aminoethyl piperazine.

In one embodiment, the curing agents selected for use with the thermosetting resins are water soluble and/or water miscible. A water soluble or water miscible curing agent may be advantageous when the selected thermosetting resin is an aqueous dispersion epoxy resin. Examples of useful curing agents capable of curing an aqueous dispersion epoxy resin include substituted imidazoles, amine moiety containing curing agents or azo moiety containing curing agents. Azo moiety containing curing agents are available from Wako Chemicals USA, Inc. as VA-60 or VA-61 azo initiators. In one embodiment, dicyandiamide, a cyano-amine, can be used. In another embodiments, a tertiary amine, boron trifluoride-ethylamine complex, or triethylamine can be used as the curing agent. The substituted imidazole may have any halogen or methyl, ethyl, butyl, or phenyl group or combinations thereof substituted onto the imidazole backbone. In one embodiment the substituted imidazole can be 2-methylimidazole or 2-ethyl-4-methylimidzaole.

In one embodiment, the adhesive layer 20 may include a light absorbing material. Examples of light absorbing materials are given above in The Cladding section.

In another embodiment, a method for fabricating an optical waveguide panel is provided. The method comprises the steps of providing a first optical core layer and a second optical core layer that each have a first and a second surface, coating the first and the second surfaces of the first and the second optical core layers with a cladding material, positioning a thermosetting adhesive between the first and second optical core layers such that the thermosetting adhesive is between the cladding material of the second surface of the first optical core layer and the cladding material of the first surface of the second optical core layer, and curing the thermosetting adhesive at a curing temperature for a period of time. The thermosetting adhesive layer includes a thermosetting resin.

The optical core, cladding material, and thermosetting adhesive may be any of the substances disclosed herein. In one embodiment, one or more layers of the waveguides may be formed using a four pass coating operation or any of the other method listed above. The layering process may be repeated as many times as necessary to achieve an optical waveguide panel. In another embodiment, waveguides may be formed as sheets that are cut and the cut pieces are stacked to form the panel. Uniform pressure may be applied to the layered structure, followed by a curing period to allow the thermosetting adhesive layer to cure. The resulting panel may be cut into a desired shape and size and may be polished after cutting.

The positioning of the thermosetting adhesive may be by coating, laminating, or by simply inserting of a sheet of the thermosetting adhesive between the cladding layers. In another embodiment, the cladding material may be coated onto the first surface of an optical core to be followed by the thermosetting adhesive being positioned on the cladding material. The optical core is turned over and the cladding material is coated onto the optical core's second surface, and followed by the thermosetting adhesive being position on the cladding material. A plurality of optical cores having the cladding and thermosetting resin applied to both the first and second surface may then be stacked together to create a panel that is cured at a curing temperature for a period of time.

EXAMPLES

Example 1

A cladding material having the composition set forth in Table 3 was prepared. The acceptance angles for this example was about ±20° from the normal of the core layer. The resulting cladding material had a surface tension of about 27 to about 28 dynes/cm, a viscosity of about 3 to about 5 centipoise and a pH of about 9 to about 10.

TABLE 3

| Chemical Ingredient | Amount |
|---|---|
| Hauthane HD-2501 | 50 grams |
| Rovene 4041 | 50 grams |
| A fluoro-surfactant | 1 gram |
| Pure water | 150 g |

An adhesive material having the composition set forth in Table 4 was prepared. The resulting adhesive material had a surface tension of about 23 to about 25 dynes/cm, a viscosity of about 3 to about 5 centipoise and a pH of about 8 to about 10.

TABLE 4

| Chemical Ingredient | Amount |
|---|---|
| Epi-Rez 3522 | 20 grams |
| Pure water | 33 grams |
| 10% 2-methylimidazole | 4 grams |
| A fluoro-surfactant | 1.2 grams |
| Carbon black | 8 grams |

The adhesive composition was applied to screen samples using four pass coating. For Example 1, the adhesive composition was cured at 80° C. for six hours. Then, the adhesive peel strength of the resulting screen samples were tested. Peel strength is the average load (g) per unit width (cm) of bond line required to separate bonded materials where the angle of separation is 180°. When the screen sample was cured for six hours the resulting peel strength was about 1100 g/cm to about 1600 g/cm.

Example 2

A waveguide was prepared using two portions of a polycarbonate base film (refractive index=1.5822) as the optical core layers. The upper and lower surfaces of the core layers were coated with the cladding material of Table 3. The two core/cladding portions were then secured together using the adhesive material of Table 4. For example 2, the adhesive composition was cured at 80° C. for six hours and the resulting screen sample had a peel strength of about 1100 g/cm to about 1600 g/cm. After curing, the optical structure was inspected and no degradation was visible in the core and cladding layers.

Example 3

A waveguide was prepared according to composition in example 1 except that a tertiary amine was substituted for the 10% 2-methylimidazole. The resulting screen sample had a peel strength of 160 g/cm.

Example 4

A waveguide was prepared according to composition in example 1 except that Boron trifluoride-ethylamine complex was substituted for the 10% 2-methylimidazole. The resulting screen sample had a peel strength of 160 g/cm.

Example 5

A waveguide was prepared according to composition in example 1 except that a triethylamine was substituted for the 10% 2-methylimidazole. The resulting screen sample had a peel strength of 160 g/cm.

Example 6

A waveguide was prepared according to composition in example 1 except that an azo initiator (VA-60 or VA-61 by Wako Chemical) was substituted for the 10% 2-methylimidazole. The resulting screen sample had a peel strength of 320 g/cm.

Thus, the present disclosure provides a method for making a panel 30 by setting a thermosetting resin-based adhesive layer 20 between adjacent waveguides or waveguide layers, wherein the components of the thermosetting resin-based adhesive layer 20 are selected such that the adhesive layer 20 cures at a relatively low temperature to avoid damaging the adjacent waveguide layers. By using a thermosetting resin, the resulting optical waveguide structure is capable of withstanding extreme environmental conditions, such as high heat, extreme cold, rain, ice, snow and the like, without degradation.

Although various embodiments of the disclosed optical waveguide coatings and associated structures and methods have been shown and described, modifications may occur to those skilled in the art upon reading the specification. The present application includes such modifications and is limited only by the scope of the claims; and therefore, is to be understood that the present invention is not limited to the particular embodiments disclosed above, but it is intended to cover such modifications and variations as defined by the following claims.

What is claimed:

1. A method for making a panel for use in extreme environmental conditions, the method comprising the steps of:
   providing a plurality of waveguides, wherein each waveguide includes an optical core layer having a first and a second surface coated with a cladding material that forms a cladding layer;
   positioning a thermosetting adhesive composition between the plurality of waveguides, wherein the thermosetting adhesive composition includes a thermosetting epoxy resin and has a curing temperature less than about 100° C.; and
   curing the thermosetting adhesive;
   wherein at least one of the cladding material or the thermosetting adhesive composition further includes a light absorbing material.

2. The method of claim 1 wherein the thermosetting adhesive composition is a layer coating at least one cladding layer.

3. The method of claim 1 wherein the thermosetting adhesive composition includes the light absorbing material.

4. The method of claim 1 wherein the light absorbing material includes at least one of a carbon black material, a pigment, and a dye.

5. The method of claim 1 further comprising the step of applying a first light absorbing layer to the cladding material coating the first surface of the optical core and a second light absorbing layer to the cladding material coating the second surface of the optical core.

6. The method of claim 1 wherein the resin is selected from the group consisting of a bisphenol epoxy, an urethane modified epoxy, a rubber modified epoxy and mixtures thereof.

7. The method of claim 6 wherein the thermosetting resin is an aqueous dispersion resin.

8. The method of claim 1 wherein the thermosetting adhesive composition further includes at least one of a curing agent, an accelerator, and a promoter.

9. The method of claim 8 wherein the curing agent is a compound comprising at least one of a substituted imidazole, an amine moiety and an azo moiety.

10. The method of claim 9 wherein the substituted imidazole is an alkyl substituted imidazole.

11. The method of claim 10 wherein the alkyl substituted imidazole is 2-methylimidazole or 2-ethyl-4-methylimidazole.

12. The method of claim 1 wherein the thermosetting adhesive composition is uncured at room temperature.

13. The method of claim 1 wherein the curing temperature is about 70 to about 90° C.

14. The method of claim 1 wherein the core layer has a first refractive index and the cladding material has a second refractive index, wherein the first refractive index is greater than the second refractive index.

15. The method of claim 14 wherein the second refractive index is selected so light rays enter the core at an acceptance angle from about ±5° to ±30°.

16. The method of claim 14 wherein the cladding material further includes at least one of a carboxylated styrene butadiene, and a polyester.

17. The method of claim 1 wherein the core layer includes at least one of glass, a polycarbonate, a polymethylmethacrylate, a polycyclic olefin, a polyester, a cellulose, and copolymers thereof.

18. The method of claim 1 wherein the cladding material includes a polymer or polymer mixture.

19. The method of claim 1 wherein the cladding material includes at least one of a carbonated or polycarbonated polyurethane, a polyestser, a styrene acrylic copolymer, a carboxylic acid, a n-butylacrylate, a polyethylene oxide, or a polyvinyl alcohol.

20. A method for making a panel for use in extreme environmental conditions, the method comprising the steps of:
providing a core layer having a first and a second surface;
coating the first and the second surfaces of the core layer with a cladding material to form a cladding layer;
positioning a thermosetting adhesive composition between a plurality of cladding coated core layers, wherein the thermosetting adhesive composition includes a thermosetting epoxy resin and has a curing temperature less than about 100° C.; and
curing the thermosetting adhesive;
wherein at least one of the cladding material and the thermosetting adhesive composition further includes a light absorbing material.

21. The method of claim 20 further comprising the step of coating the cladding material that is on the first and second surfaces of the core layer with a light absorbing material to form a light absorbing layer.

22. The method of claim 20 wherein the thermosetting adhesive composition includes the light absorbing material.

23. The method of claim 20 wherein the resin is selected from the group consisting of a bisphenol epoxy, an urethane modified epoxy, a rubber modified epoxy and mixtures thereof.

24. The method of claim 23 wherein the thermosetting resin is an aqueous dispersion resin.

25. The method of claim 23 wherein the thermosetting adhesive composition is uncured at room temperature.

26. The method of claim 25 wherein the thermosetting adhesive composition farther includes a curing agent selected from at least one of a substituted imidazole, an amine moiety and an azo moiety.

27. The method of claim 26 wherein the substituted imidazole is an alkyl substituted imidazole.

28. The method of claim 27 wherein the alkyl substituted imidazole is 2-methylimidazole or 2-ethyl-4-methylimidazole.

* * * * *

UNITED STATES PATENT AND TRADEMARK OFFICE
CERTIFICATE OF CORRECTION

PATENT NO. : 7,496,263 B2
APPLICATION NO. : 11/759462
DATED : February 24, 2009
INVENTOR(S) : Ming Xie and Kenneth L. Strickland Page 1 of 1

It is certified that error appears in the above-identified patent and that said Letters Patent is hereby corrected as shown below:

On the Title Page, Item (73)

Assignee: "Manfacturing" should read "Manufacturing"

Claim 19, Col. 15, Line 5: "polyestser" should read "polyester"

Signed and Sealed this

Fifth Day of May, 2009

JOHN DOLL
*Acting Director of the United States Patent and Trademark Office*